May 11, 1971 V. A. M. G. VORAGE 3,578,413

APPARATUS FOR THE PRODUCTION OF MELAMINE FROM UREA

Filed Nov. 21, 1968

INVENTOR
VICTOR A.M.G. VORAGE

BY Cushman, Darby & Cushman
ATTORNEYS 3,578,413
APPARATUS FOR THE PRODUCTION OF
MELAMINE FROM UREA
Victor A. M. G. Vorage, Beek, Netherlands, assignor to
Stamicarbon N.V., Heerlen, Netherlands
Filed Nov. 21, 1968, Ser. No. 777,705
Claims priority, application Netherlands, Nov. 21, 1967,
6715751
Int. Cl. B01j 9/20; C07d 55/28
U.S. Cl. 23—260                    2 Claims

ABSTRACT OF THE DISCLOSURE

Apparatus for producing melamine from urea which includes in combination a reactor and separating devices in communication therewith for removing melamine from the reaction product and recovering $NH_3$ from the essentially melamine-free reaction product. The recovered $NH_3$ is recycled to the reactor to fluidize the catalyst bed therein and to atomize the urea fed thereto for conversion into melamine. Venting conduit means and supplemental ammonia conduit means are also provided. Means for sensing the pressure in the reactor and separating devices and for sensing the amount of ammonia introduced into the reactor to fluidize the catalyst bed are employed and in response to the sensed pressure and quantity values. The pressure and amount of ammonia utilized are controlled to maintain the reactor in operational condition.

Figure 1:
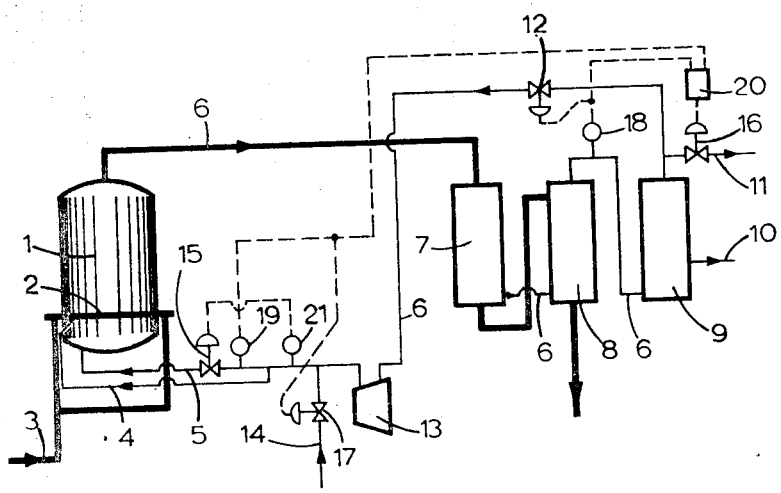

This invention relates to the production of melamine and particularly to improved apparatus for the production of melamine by the pyrolysis of urea in the presence of ammonia in a fluidized catalyst bed reactor. The apparatus of this invention comprises in combination a reactor and a circulation conduit system for gaseous ammonia, which conduit system, before entering the reactor, bifurcates into a supply line for introducing a fluidization medium for the catalyst bed in the fluidization of the reactor and a supply line for introducing a urea atomization medium into the reactor and, after the reactor, includes one or more separating devices for removing substances from the ammonia current. Between the separating devices and the point of bifurcation, the gaseous ammonia circulatory system is provided with one or more branch lines for the introduction of supplemental amounts of ammonia into the reactor and/or venting of ammonia. The circulation conduit system of this invention is also provided with pressure and quantity regulator sensing means, in response to which are means to regulate the pressure of the reactor and associated separating devices and the introduction of ammonia to the reactor and venting of ammonia from the reactor system.

The fluidized catalyst bed in the reactor is maintained at a high temperature by means of heating tubes (not shown) or other conventional heating means. The catalyst used can be, for instance, silica gel, activated bauxite, silica alumina, aluminum phosphate, boron phosphate or the like, in discrete particulate form. The liquid urea supply is atomized in this bed by means of a number of sprays, with gaseous ammonia being used as the atomizing medium. The reaction gases leaving the reactor consist of melamine vapour, gaseous ammonia and carbon dioxide.

As ammonia is continuously being formed in the reactor, according to the equation $$6CO(NH_2)_2 \rightarrow C_3N_6H_6 + 3CO_2 + 6NH_3$$

ammonia is vented almost constantly.

With known conventional apparatus it has so far been problematic in certain circumstances how to keep the reactor in operating condition when production stops. Stoppage may occur, for instance, if a compressor in the circulation conduit malfunctions or cuts out. The reactor is considered to be in operating condition when the required pressure of about 100-120 p.s.i. is maintained and the catalyst bed remains fluidized. It is known that to establish operating conditions it is necessary that the flow of fluidization gas should be kept up at the required rate which rate generally is about 5700 to 6500 cu. m./h. In most cases it is the failure of the required control of these two factors, pressure and flow rate of fluidization medium, that causes the problem referred to.

One known way of keeping the feed for fluidization and atomization at the desired value is to introduce supplemental amounts of fluidization and atomizing media when required and to control the pressure in the reactor separately, and by additional venting procedures. However, it has been found that such control does not produce optimum operating results. The introduction of supplemental amounts of fluidization and atomizing media is almost continuous, and venting of a carbonate solution containing ammonia can become so high that further processing of this flow is uneconomic, so that the melamine production has to be stopped.

The present invention overcomes the disadvantage of prior art apparatus for producing melamine by providing operatively integrated means for controlling the pressure in the reaction system and the introduction of supplemental amounts of ammonia thereto. The novel apparatus of this invention comprises in combination a fluidized bed reactor having an inlet and outlet; means for introducing urea into the reactor; separating means in communication with the outlet of said reactor for removing melamine from the reaction product and for separating ammonia values from the remaining gaseous effluent; means for circulating gaseous ammonia in said apparatus comprising a first gaseous ammonia circulating conduit means communicating between the outlet of the reactor and the separating means; second gaseous ammonia circulating conduit means communicating between the outlet of said separating means and the inlet of the reactor, said second gaseous ammonia circulating conduit being bifurcated to provide conduit means for introducing catalyst bed fluidization medium into said reactor and to provide conduit means for introducing urea atomizing medium into said reactor and being provided, upstream of the point of bifurcation with conduit means in valved communication therewith for venting gaseous ammonia and conduit means in valved communication therewith for introducing supplemental gaseous ammonia into said reactor, control means for sensing and regulating the pressure in said apparatus and the quantity of ammonia containing gas circulated therein comprising fluidization medium sensing means operatively, connected to said conduit means for introducing catalyst bed fluidization medium into said reactor, pressure sensing means operatively connected to said first gaseous ammonia circulating conduit means at a point intermediate said reactor outlet and the inlet of said means for separating ammonia values from the remaining gaseous effluent from said reactor and comparison means for receiving signals produced by each of said fluidization medium sensing means and pressure sensing means, first valve means in said second gaseous ammonia circulating conduit positioned intermediate the outlet of said separating means and the point of bifurcation thereof, said first valve means being responsive to the signal produced by said pressure sensing means, second valve means in said conduit means for introducing supplemental gaseous ammonia into said reactor, said second valve means being responsive to the signal produced by said fluidization medium sensing means and third valve means in said conduit for venting gaseous ammonia, said third valve means being responsive to signals transmitted by said comparison means.

Preferably, also, the apparatus of this invention includes a further pressure sensing means operatively connected to said second gaseous ammonia ciriculating conduit means at a point upstream of the point of bifurcation and fourth valve means in said conduit means for introducing catalyst bed fluidization medium into said reactor, said fourth valve means being responsive to the signal produced by said further pressure sensing means.

With the control according to the invention, substantially no supplemental gaseous ammonia is introduced into the circulation conduit under ideal conditions. The pressure has direct control of the circulating flow, and only in emergency cases does it operate the venting system, and the quantity controls introduction of supplemental gas or the venting as the need arises. In this way a considerable decrease (e.g. 50%) of the venting of ammonia-containing carbonate solution can be obtained.

As stated above, the control system of this invention can be further improved by providing a second pressure regulator sensing means in the ciriculation conduit, before the point of bifurcation in the second gaseous ammonia ciriculating conduit, which pressure regulator sensing means operates a control valve in the fluidization feed line in response thereto. The pressure and the quantity of the fluidization gas will then exert such an influence on each other that they have the desired values, while, moreover, the pressure of the atomization gas is accurately controlled.

Figure 2:
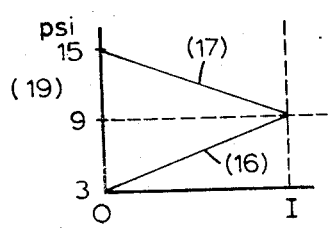
Figure 3:
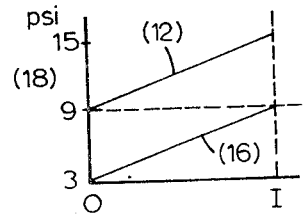

The invention will be elucidated with reference to the drawing, in which FIG. 1 is a schematic illustration of the apparatus of this invention for the production of melamine from urea; FIG. 2 shows the relation between the signal from a quantity regulator sensing means and the valve positions controlled by it, and FIG. 3 shows the relation between the signal from a pressure regulator sensing means and the valve positions controlled by it.

A reactor 1 is fed urea through an inlet comprising ring conduit 2, which receives the urea from a line 3, atomization gas through a line 4, and fluidization gas through a line 5. Lines 4 and 5 together form part of a second gaseous ammonia circulating conduit means which, in turn, is part of the overall means 6 for circulating gaseous ammonia in the apparatus of this invention. Another part of this overall circulating means 6, is a first gaseous ammonia circulating conduit means which communicates between the outlet of the reactor and the separator means 7, 8 and 9. The contents of the gas leaving the outlet of the reactor 1 and as it enters the saturation cooler 7 consists of about 70% of ammonia and to 13% of melamine vapour, the remainder being essentially $CO_2$. In saturation cooler 7 the melamine vapour is sublimated, most of it is taken up, and part of it dissolved in a washing liquid. All of the remaining melamine vapour is collected in the washing liquid of scrubber 8. From the top of the scrubber 8 the remaining $NH_3/CO_2$ mixture, which is saturated with water vapour, is passed on to an absorber 9. In this absorber 9 a carbonate solution containing ammonia is separated out, which solution is removed through a conduit 10. The contents of the section of the conduit 6 after the absorber 9 consists to about 97% of ammonia. This section of conduit 6, i.e. from the outlet of the separating means 9 to an inlet of reactor 1 comprises the second gaseous ammonia circulating conduit means. Between the absorber 9 and the point of bifurcation of the second gaseous ammonia circulating conduit into the lines 4 and 5, the conduit is provided with a branch to a vent line 11, a control valve 12, a compressor 13 and a branch 14 for introducing supplemental gaseous ammonia into the reactor 1. The line 5 for introducing catalyst bed fluidization medium into the reactor 1 is equipped with a control valve 15, the vent line 11 has a control valve 16, and the supplementation line 14 has a control valve 17.

The pressure in the separating devices 7, 8 and 9 and in the reactor 1 is detected by a pressure regulator sensing means 18, mounted on the first gaseous ammonia circulating conduit means of conduit 6 between the scrubber 8 and the absorber 9. On the line 5 a quantity regulator sensing means 19 is mounted. These two regulator sensing means are connected to a comparison element 20, which operates the control valve 16 in the vent line 11. The quantity regulator sensing means 19 further operates the valve 17, and the pressure regulator sensing means 18 operates valve 12. A second pressure regulator sensing means 21, mounted on the line 6 immediately ahead of the point of bifurcation, operates valve 15 in line 5.

The signals passed by regulator sensing means 18, 19 and 21 to the valves via the dashed connecting lines shown in FIG. 1 are pneumatic pressures, which may vary from 3 to 15 p.s.i.

The regulator sensing means in the example referred to here operate in such a way that high measuring values (for pressure or quantity) result in low signal values, and vice versa.

The quantity regulator sensing means 19 emits a signal which can operate valve 16 between 3 and 9 p.s.i., and operates valve 17 between 9 and 15 p.s.i. If the signal is 15 p.s.i., valve 17 is fully open (O in FIG. 2), and if the signal is 9 p.s.i., valve 17 is fully closed (I in FIG. 2).

The pressure regulator sensing means 18 emits a signal which can operate valve 16 between 3 and 9 p.s.i. and operates valve 12 between 9 and 15 p.s.i. At a signal of 15 p.s.i. valve 12 is fully closed (I in FIG. 3), and at a signal of 9 p.s.i. valve 12 is fully open (O in FIG. 3).

If the comparison element 20 receives a signal of between 3 and 9 p.s.i. from only one of the regulator sensing means 18 and 19, this signal is passed on to the valve 16. If the comparison element 20 receives a signal of between 3 and 9 p.s.i. from each of the regulator sensing means 18 and 19, that signal is passed on which tends to effect the widest opening of valve 16, i.e. that signal which has the lowest p.s.i. value.

Under ideal operating conditions both regulator sensing means 18 and regulator sensing means 19 emit a signal of about 9 p.s.i. This means that the valves 16 and 17 are closed completely or almost completely, and that valve 12 is open. No ammonia is vented through line 11 (although a vent flow of ammonia does pass through line 10), and none is supplied through line 14, while the circulatory current is not hindered by valve 12.

If the pressure regulator sensing means 18 measures a value that is slightly too low, i.e. a signal in the order of about 10 p.s.i., the valve 12 will move slightly to the closed position. If, as a result of the fall in pressure and the throttling of valve 12, the quantity regulator sensing means 19 emits too high a signal, the supplementation valve 17 will be slightly opened. It should be remarked here that the arrangement shown in the diagram of FIG. 1 is schematic and it will be appreciated that a slight pressure drop does not necessarily result in the quantity becoming too small.

When the pressure regulator sensing means 18 measures a value that is slightly too high and the signal emitted therefrom amounts to, for instance, 8 p.s.i., the vent valve 16 will be slightly opened, or, if it was already slightly open as a result of a signal of 8–9 p.s.i. emitted by regulator sensing means 19, it will be opened slightly further.

Under favourable operating conditions the signals compared by the comparison element 20 will not differ materially.

Should, during the operation of the apparatus herein, compressor 13 cut out or malfunction, the flow in the line 5 will become too small, i.e. the signal from the quantity regulator sensing means 19 will emit a signal in the order of about 13–15 p.s.i., which results in the supplementation valve 17 being fully opened. No ammonia is removed from absorber 9, so that the pressure regulator sensing means 18 measures too high a value and emits a signal of, e.g., 4 p.s.i. As a consequence, the vent valve 16 is fully opened. Under these circumstances, the urea feed and hence the production of melamine are stopped automatically. The amount of atomization gas delivered to the reactor via conduit 4 can now be reduced considerably. A control for this reduction can be coupled to the urea feed.

Should the urea feed stop without any one of the units shown in FIG. 1 being at fault, the production of melamine drops to zero. The control signal from regulator sensing means 18 increases, as a consequence of which valve 12 is closed. The result is a stronger signal from regulator sensing means 19, which effects an opening of supplementation valve 17.

In practice, operation failures arise which cause both the quantity and the pressure to be much too high, while the operating signals from regulator sensing means 19 and 18 are widely different, amounting, for instance to 7 and 4 p.s.i. The comparison element 20 now passes on the lowest signal, so that the pressure quickly returns to the correct value. If, meanwhile, there is temporary over-venting of ammonia, so that the signal from regulator sensing means 19 increases to 10–11 p.s.i., temporary introduction of supplemental gaseous ammonia to the reactor via conduit 14 is effected.

If, in the last-mentioned case, the control signals are 4 and 7 p.s.i. instead of 7 and 4 p.s.i., the quantity of gaseous ammonia being introduced into the reactor 1 will quickly revert to the correct value. Should the pressure drop slightly too much in this case, a slight throttling action of valve 12 will result.

If the pressure regulator sensing means 21 measures too low a pressure, valve 15 will be throttled. This reduces the quantity of gaseous ammonia being introduced into the reactor whereupon supplemental amounts of gaseous ammonia via line 14 are supplied to the reactor. In this way the quantity of ammonia and the pressure in the fluidization line 5 are kept accurately constant. The quantity of ammonia in line 4 is not measured, but the correct pressure in this line is guaranteed by the said pressure control.

The apparatus of the present invention renders it possible in a simple way to effect a substantially improved control of the production of melamine from urea by reacting to failures of widely varying kinds that would cause fluidization of the catalyst bed to stop or would cause such other failures as the rupture of the circulation conduit between the scrubber 8 and the compressor 13.

The regulator sensing means 18 and 21 are indicating pressure transmitters and the regulator sensing means 19 is a non-indicating pressure difference transmitter. The comparison element 20 is formed by a low pressure selector.

I claim:

1. Apparatus for producing melamine from urea in the presence of ammonia in a fluidized catalyst bed reactor comprising in combination:
   (1) a reactor having inlet and outlet,
   (2) means for introducing urea into said reactor,
   (3) separating means in communication with the outlet of said reactor including means for removing melamine from the reaction product, and means for separating ammonia values from the remaining gaseous effluent from said reactor for circulation in said apparatus, and
   (4) means for circulating gaseous ammonia in said apparatus comprising:
      (a) first gaseous ammonia circulating conduit means communicating between the outlet of said reactor and said means for separating ammonia values from the remaining gaseous effluent from said reactor,
      (b) second gaseous ammonia circulating conduit means communicating between the outlet of said means for separating ammonia values from the remaining gaseous effluent from said reactor and the inlet of said reactor, said second gaseous ammonia circulating conduit means being bifurcated to provide conduit means for introducing catalyst bed fluidization medium into said reactor and to provide conduit means for introducing urea atomizing medium into said reactor and being provided upstream of the point of bifuration with,
      (c) conduct means in communication therewith for venting gaseous ammonia, and
      (d) conduit means in communication therewith for introducing supplemental gaseous ammonia into said reactor,
      (e) control means for regulating the pressure in said apparatus and the quantity of ammonia circulated therein comprising:
         (i) fluidization medium sensing means operatively connected to said conduit means for introducing catalyst bed fluidization medium into said reactor,
         (ii) pressure sensing means operatively connected to said first gaseous ammonia circulating conduit means at a point intermediate said reactor outlet and the inlet of said means for separating ammonia values from the remaining gaseous effluent from said reactor,
         (iii) comparison means for receiving signals produced by each of said fluidization medium sensing means and pressure sensing means,
         (iv) first valve means in said second gaseous ammonia circulating conduit means positioned intermediate the outlet of said separating means and the point of bifurcation thereof, said valve means being responsive to the signals produced by said pressure sensing means,
         (v) second valve means in said second gaseous ammonia circulating conduit means for introducing supplemental gaseous ammonia into said reactor, said second valve means being responsive to the signals produced by said fluidization medium sensing means, and
         (vi) third valve means in said conduit means for venting gaseous ammonia, said third valve means being responsive to signals transmitted by said comparison means.

2. The apparatus of claim 1 including further pressure sensing means operatively connected to said second gaseous ammonia circulating conduit means at a point upstream of the point of bifurcation, and fourth valve means in said conduit means for introducing catalyst bed fluidization medium into said reactor, said fourth valve means being responsive to the signals produced by said further pressure sensing means.

References Cited

UNITED STATES PATENTS

| | | | |
|---|---|---|---|
| 2,583,255 | 1/1952 | Clark | 23—288.3X |
| 3,128,129 | 4/1964 | Stime et al. | 23—288.3X |
| 3,166,381 | 1/1965 | Loss | 23—288.3 |
| 3,239,522 | 3/1966 | Cook et al. | 260—249.7 |
| 3,290,308 | 12/1966 | Marten | 260—249.7 |
| 3,377,350 | 4/1968 | Watson et al. | 260—249.7 |

JOSEPH SCOVRONEK, Primary Examiner

U.S. Cl. X.R.

23—253A, 288S; 260—249.7